US012223217B2

(12) United States Patent
Porter, Jr.

(10) Patent No.: US 12,223,217 B2
(45) Date of Patent: Feb. 11, 2025

(54) PORTABLE SCOREBOARD APPARATUS AND METHOD

(71) Applicant: Van Reginald Porter, Jr., Gilbert, SC (US)

(72) Inventor: Van Reginald Porter, Jr., Gilbert, SC (US)

(*) Notice: Subject to any disclaimer, the term of this patent is extended or adjusted under 35 U.S.C. 154(b) by 98 days.

(21) Appl. No.: 18/335,284

(22) Filed: Jun. 15, 2023

(65) Prior Publication Data

US 2024/0419380 A1    Dec. 19, 2024

(51) Int. Cl.
| | |
|---|---|
| *G06F 3/0484* | (2022.01) |
| *G06F 3/0482* | (2013.01) |
| *G06F 3/14* | (2006.01) |
| *G06F 3/16* | (2006.01) |

(52) U.S. Cl.
CPC ............ *G06F 3/14* (2013.01); *G06F 3/0482* (2013.01); *G06F 3/0484* (2013.01); *G06F 3/162* (2013.01); *G06F 3/165* (2013.01)

(58) Field of Classification Search
None
See application file for complete search history.

(56) References Cited

U.S. PATENT DOCUMENTS

| | | | | |
|---|---|---|---|---|
| 10,230,996 | B1* | 3/2019 | Abreu | H04N 21/4884 |
| 2007/0197247 | A1* | 8/2007 | Inselberg | G06Q 30/02 |
| | | | | 455/517 |
| 2012/0256373 | A1* | 10/2012 | Tam | A63D 15/20 |
| | | | | 273/148 R |
| 2020/0110942 | A1* | 4/2020 | Bornfreedom | H04N 21/44008 |
| 2021/0016151 | A1* | 1/2021 | Bokowski | G06F 16/48 |

OTHER PUBLICATIONS

"Scoreboard Software—Transform your TV + computer into a scoreboard—Intro to PC Scoreboards" Published on Oct. 30, 2017 https://www.youtube.com/watch?v=yyrjeOsbKpU.*

* cited by examiner

*Primary Examiner* — Rinna Yi
(74) *Attorney, Agent, or Firm* — Southeast IP Group LLC; Thomas L. Moses

(57) ABSTRACT

A portable electronic scoreboard is provided, and is wirelessly connected to a portable computing device, such as a smartphone, a tablet, a laptop computer, or other portable computing device. A user, such as a parent watching the game or an official scorekeeper, may download a software application, or an "app," to their smartphone, for instance, which allows them to remotely operate the scoreboard, displaying the score and other relevant information. The app may include multiple interfaces, such as a scorekeeper interface for keeping score and other relevant information, a fan interface for viewing the scoreboard screen on their own smartphone and uploading pictures and video, an audio/video interface allowing a designated user to display fan uploaded pictures and video highlights during timeouts on the scoreboard, and an announcer interface allowing a designated announcer to make announcements through speakers operatively connected to the portable scoreboard.

8 Claims, 8 Drawing Sheets

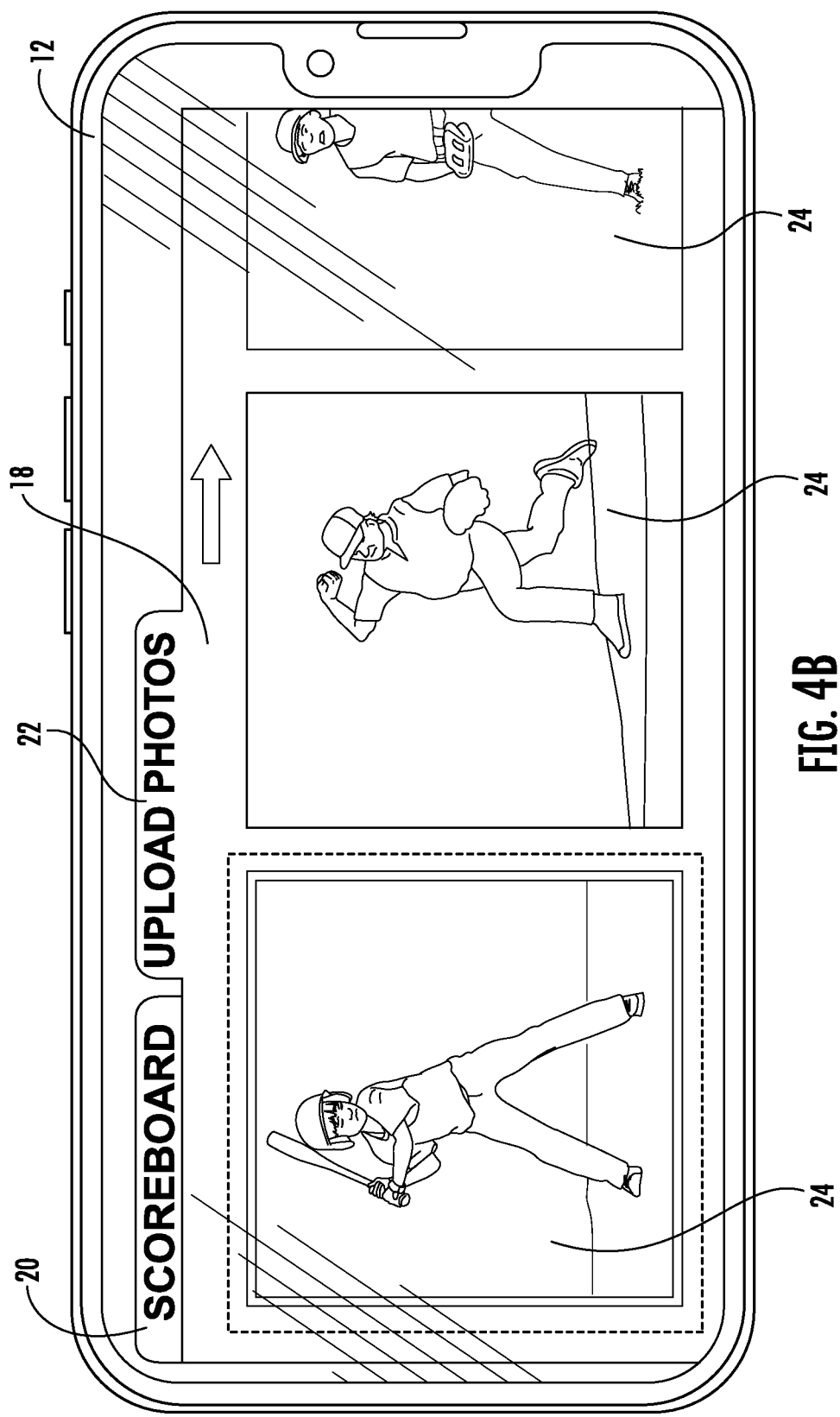

PORTABLE SCOREBOARD APPARATUS AND METHOD

FIELD OF THE INVENTION

The present invention relates generally to portable scoreboards and associated systems for use by recreational sports leagues, in backyards and neighborhood type, informal sporting events. More specifically, the present invention includes a portable electronic scoreboard that may be operated via a smartphone, tablet, computer or other portable computing device, and which includes an interactive interface that allows a group of people to view game information and share pictures and video to the portable electronic scoreboard.

BACKGROUND OF THE INVENTION

Many people, particularly including children, participate in recreational sports leagues, such as Little League baseball, recreation league basketball, softball, flag football, and the like. Oftentimes, the venues where these sporting events are played do not have the same types of sophisticated, electronic scoreboards that might be seen at professional, college, or even large high school stadiums and arenas. Generally, if a scoreboard is available at these kinds of recreational venues, the scoreboard often consists of a manually operated mechanism, or includes hanging plaques with numbers to indicate the score of the game (particularly at local baseball fields).

Thus, it would be desirable to provide a portable electronic scoreboard that could be brought to a local sporting event by a parent or coach, and would allow fans to be able to see the score in real time. Additionally, it would be desirable to provide a scoreboard system that could be wirelessly operated via a smartphone, tablet, computer or other portable electronic device, and to provide an interactive experience with the fans, so that they could take pictures or video of players and upload those picture or video files through a software application (an "app") for viewing on the portable electronic scoreboard.

Attempts to improve portable scoreboards have been made over the years, and the following references disclose and describe a number of such attempts. The references cited hereinbelow are hereby incorporated by reference, in their entireties:

U.S. Patent Publication No. US20040166966A1—Portable Scoreboard

The preferred scoreboard of this invention includes an electronic controller, an antenna, a power source, and commercially available electromechanical display devices, inside a weatherproof case, and two alternative remote control units, one a full function remote control, and the other a partial function, or "umpire," remote control. The electronic controller includes a microprocessor, an RF receiver section, a power control section, and a display control section. It may also include, and preferably does include, an address selection section and a battery voltage measurement section. The RF receiver section receives pulsed or coded radio frequency signals from the remote controls, and converts them to binary DC signals for the microprocessor. The microprocessor decodes the input and controls the display control section. The display control section controls the switching of power to individual electromagnets in the electromechanical display devices. The power control section provides a controllable regulated voltage to the microprocessor, and a separately controlled regulated voltage to the display control section. The available address selection allows "unit address" selection and rejects incoming signals from remote controls that lack the identical unit address. The available battery voltage measurement section allows the condition of the power source to be displayed.

U.S. Pat. No. 10,376,766—Scoreboard and System

A scoreboard system, the system including a scoreboard. The scoreboard is configured to display at least one score. A battery pack is removably coupled to the scoreboard and selectively powers the scoreboard. The battery pack includes a housing and at least one battery cell housed in the housing.

U.S. Pat. No. 10,076,699—Scoreboard Apparatus for Various Sports Games

A scoreboard apparatus for various sports games, comprising: a display module, an operation panel module, control module and a wireless communication module, wherein the control module displays the proceeding information about the corresponding sports game on the display module according to the preset sports game corresponding to the input signal of the selected operation switch unit, when the control module continuously receives the input signal from any one operation switch unit selected from the plurality of operation switch units provided in the operation panel.

U.S. Pat. No. 5,894,261—Score Keeping Display Apparatus

A score keeping display apparatus includes a three-sided, generally triangular scoring display tier, each side of the display tier including two sets of dual character displays and two sets of LED indicators associated with each of the displays. The scoring display tier is supported on the upper end of a vertical post which is anchored at an opposite end to a base control unit. The base control unit is connectable to a power supply and contains a battery, battery charger, control circuit board, mini displays replicating the display tier, and control switches for operating the scoring display.

U.S. Pat. No. 4,045,788—All purpose Portable Scoreboard

A portable self-contained scoreboard adaptable for use with a variety of different sports. The self-contained scoreboard has a plurality of variable numeral displays. Some of the numeral displays are constructed to function as a controllable clock which can count up or count down. The clock numerals can also be manually controlled to be used to indicate other desired information. A plurality of descriptive placards are provided with the self-contained portable scoreboard. The placards are constructed to be attachable to the face of the scoreboard. Selected placards can be attached to the scoreboard to render the scoreboard face applicable for scoring a variety of sports. The numeral and indicator light controls are then selected to be in accordance with the placard modified scoreboard face for use with the desired sport. This permits the scoreboard to be adaptable for use with a wide variety of sporting events. A pair of indicating timers adapted for use with the scoreboard can also be provided. This pair of timers is adjustable to count automatically from 1 to 99 seconds for use as shot timers or game delay timers. The scoreboard is operable from a conventional 120 volt AC supply or from a portable gasoline generator. A brightness control is provided for changing the intensity of the number shown on the numeral displays. When the scoreboard is used outdoors, the brightness is increased to enhance visibility of the displays.

Canadian Patent Application No. 2,695,959—Method and System for an Intelligent Portable Scoreboard with Customizable and Self Officiating Capabilities The present invention is a personalized scoreboard that is customizable, with built-in score keeping intelligence, and the ability for the players themselves to officiate the game according to official scoring rules of the sport. The scoreboard is a portable design that utilizes one or more wireless remote control modules that are worn by the players during game play, to control the scorekeeping functionality.

WIPO Patent Publication No. WO2019126692A1—Portable Scorekeeping Device

Apparatus, method and system of portable scorekeeping device including a scoreboard device, a smart wristband device, and a scoreboard device functioning with a smart wristband device. The scoreboard device comprising at least one display region including low resolution light emitting diode light emitters of different colors and a frame containing the at least one display region, wherein the scoreboard device is formed of at least one soft material to enable folding of the at least one display region of the scoreboard device without using a joint. The scoreboard device wirelessly and communicatively connects with a wristband device which controls displaying, updating and storing the scores of one of the sports freely selected or customized by a user.

U.S. Patent Publication No. US20180028895A1—Scoreboard and System

A scoreboard system, the system including a scoreboard. The scoreboard is configured to display at least one score. A battery pack is removably coupled to the scoreboard and selectively powers the scoreboard. The battery pack includes a housing and at least one battery cell housed in the housing.

U.S. Patent Publication No. US20160213995A1—System for Providing Game-Related Information An electronic apparatus for providing game-related information includes a computer processor, a memory device, a display screen, a transmitter, and a communication interface. The memory device stores at least one piece of computer code executable by the computer processor and data used by the computer code. The transmitter enables information to be communicated to a scoreboard. The communication interface enables information to be communicated to subscribers identified on a subscriber list stored in a database of the memory device. The computer code includes code for providing a user interface on the display screen to enable a scorekeeper to input an information item relating to a game, controlling the transmitter to transmit the information item to the scoreboard, controlling the memory device to store the information item in a memory therein, and controlling the communication interface to transmit the information item to at least one subscriber identified on the subscriber list.

U.S. Patent Publication No. US20120256373A1—Portable Electronic Scoreboard for Officiating a Sporting Game A portable scoreboard system comprising of a microcontroller running a software algorithm that keeps score of a sports game and officiates the game to ensure fair play according to the rules of the sport. The official rules of all the sports are stored in the device memory. The updating of the score is carried out with wireless remote control modules worn by the players and/or users. The score is only updated when the algorithm has confirmed no game rule violations. The real time score information is then displayed on the scoreboard panel plus appropriate audio sounds are played. Game related scores and user settings are stored into memory on a real time basis and can be retrieved externally for post-game analysis.

All of the above-mentioned references describe improvements that have been made to portable scoreboards and systems, but each of them has its own set of disadvantages, and none offer the desired portability, interactivity and operational efficiency of the present invention.

BRIEF SUMMARY OF THE INVENTION

The present invention relates to a portable electronic scoreboard system. In one embodiment, a portable electronic scoreboard is provided, and is operationally (and preferably wirelessly) connected to a portable computing device, such as a smartphone, a tablet, a laptop computer, or other portable computing device. A user, such as a fan or parent watching the game or an official scorekeeper, may download a software application, or an "app," to their smartphone, for instance, which allows them to operate the scoreboard, keeping track of the score and other relevant information. For example, if used for a baseball or softball game, the scoreboard might display the current inning, the pitch count, the score, and might possibly even show the location of current baserunners. The app may include a password protected interface to update the scoring information, etc., and this password protected interface is referred to as the 'scorekeeper interface.'

Additionally, the app may also be shared with other fans, who can view the same score screen (showing the same information as the scoreboard, for instance) on their own smartphone or tablet, using a 'fan interface.' The fan interface may also allow the fan or parent to take pictures or video of the players and game action, and may further allow the fan to upload those pictures or video to the scoreboard for display during timeouts, between innings, or the like. The app may also allow fans to keep up with the score remotely, and potentially to view everything that is shown on the scoreboard, even if they are physically removed from the game location.

The app may include multiple interfaces, such as a scorekeeper interface, a fan interface, an audio/video interface, and an announcer interface, as examples. The scorekeeper interface is used by a scorekeeper to enter current game information. The fan interface allows fans to see the same display as the portable scoreboard on their own smartphones or handheld devices, and to upload pictures and video of the players and game highlights for display on the scoreboard. The audio/video interface allows a designated user to select uploaded pictures and video for display on the scoreboard (as well as on fan's personal smartphone screens, if desired). The announcer interface allows a designated person to announce the game, or portions of the game, or any other information through speakers on the portable scoreboard, as well as through speakers of fans' personal smartphones or handheld devices.

DESCRIPTION OF THE DRAWINGS

These and other features, aspects, and advantages of the present invention will become better understood with regard to the following description and accompanying drawings where:

FIG. 4B is a front view of another embodiment of a portable scoreboard system, showing a smart phone that is in wireless communication with a portable scoreboard, and the smart phone is displaying a fan interface that allows a fan to upload pictures and videos to the system for display on the portable scoreboard;

DETAILED DESCRIPTION OF THE INVENTION

Figure 1:
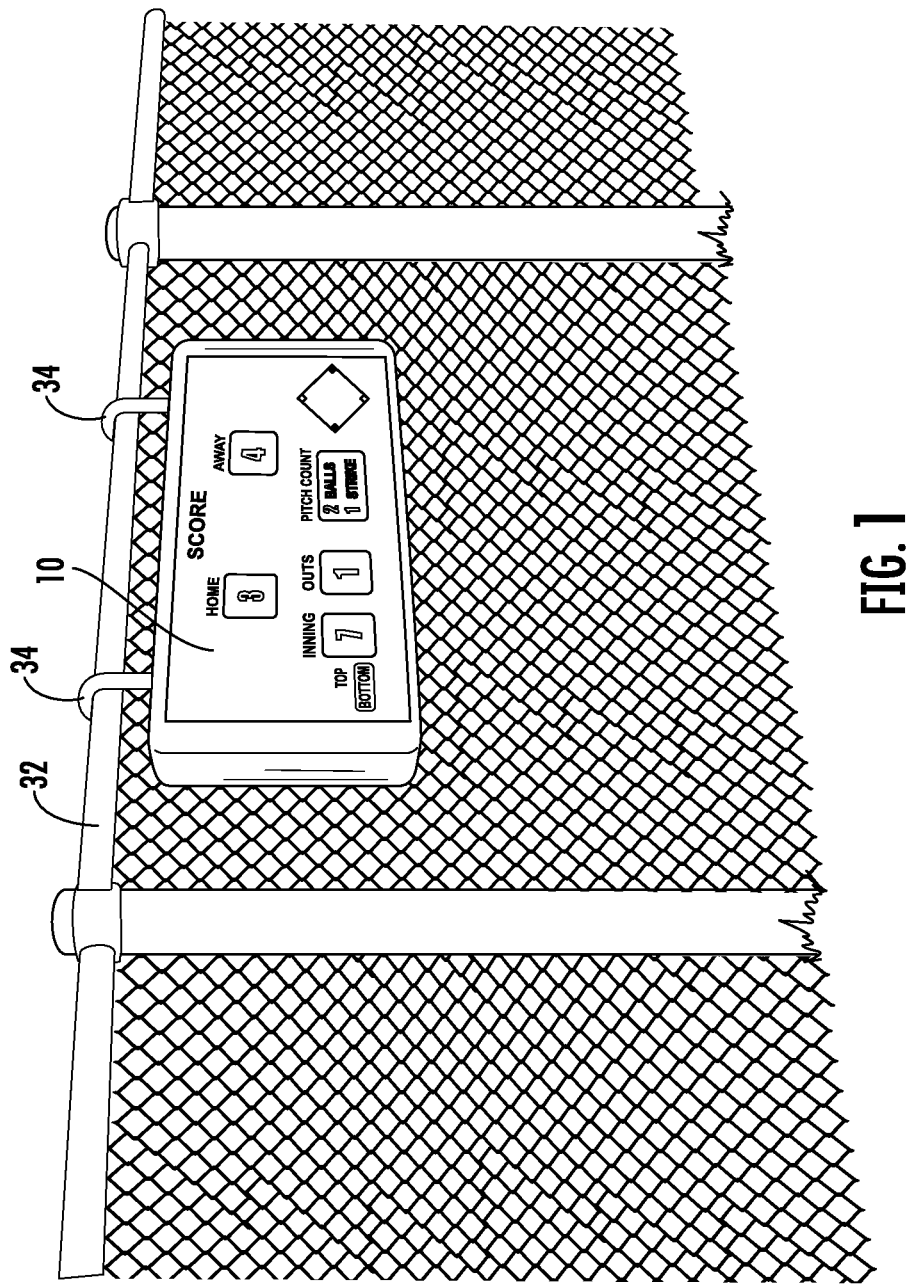
FIG. 1 is a perspective view of one embodiment of a portable scoreboard, wherein the portable scoreboard is shown having hooks that are removably attachable to a fence, and displaying game information for a baseball game, including the score, inning, pitch count and the location of current base-runners.
Figure 2:
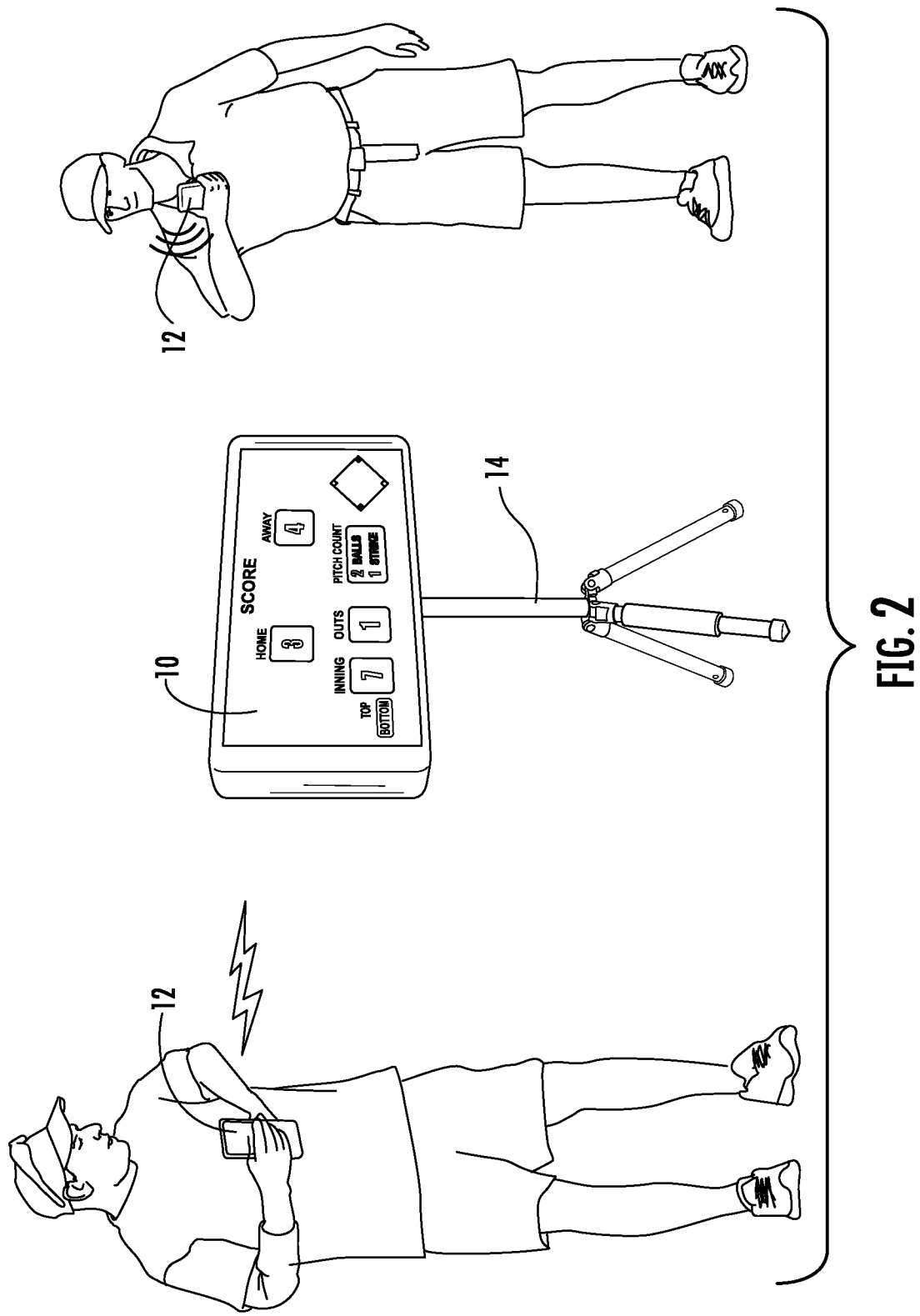
FIG. 2 is a perspective view of another embodiment of a portable scoreboard illustrating game information for a baseball game, and further showing multiple people interacting with and wirelessly operating the portable scoreboard.

In a first embodiment of the present invention, a portable electronic scoreboard 10 is operationally connected, preferably wirelessly, to remote control device 12, which is preferably a smartphone, tablet, laptop computer or other portable or handheld computing device. The portable scoreboard 10 itself may take any suitable form and be of any suitable size. Suitable forms include any type of suitable video screen or monitor, such as a television, computer monitor, touchscreen, LED display, or the like. In a preferred embodiment, the scoreboard 10 may include a stand 14, or may include attachment means such as hooks 34 for attaching the scoreboard to a ballpark fence 32, for example, as shown in FIGS. 1 and 2. The portable electronic scoreboard 10 may include its own power source, such as a rechargeable battery or non-rechargeable battery (or batteries), or it may include a cord to plug into a standard electrical outlet or a USB type of outlet, or the like. The scoreboard 10 may be of any appropriate size, and may resemble a flat screen television or computer monitor, and is preferably waterproof or water resistant, as it will be likely be used in outdoor settings, as shown in FIG. 1.

Figure 3:
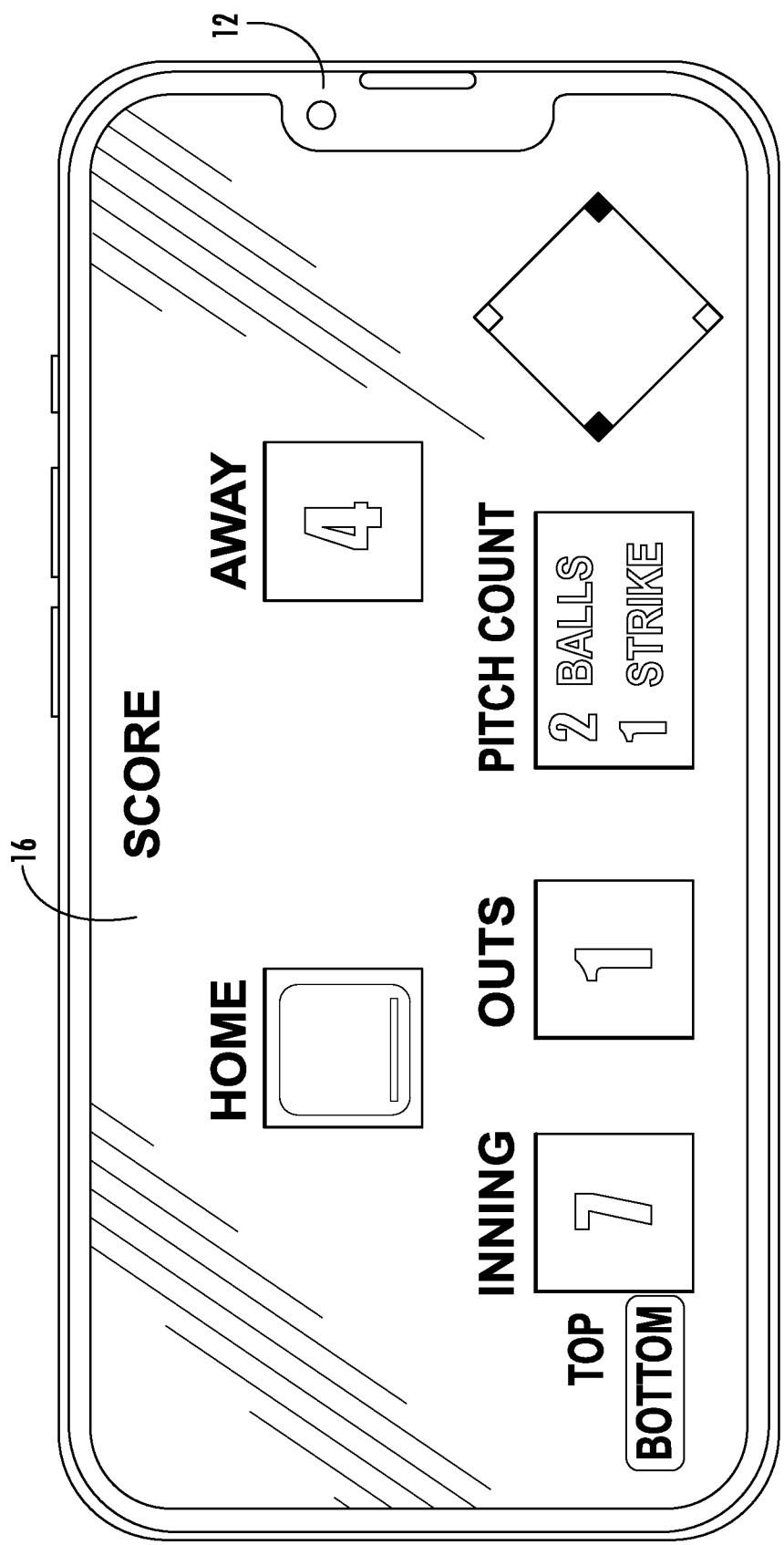
FIG. 3 is a front view of another embodiment of a portable scoreboard system, showing a smart phone that is in wireless communication with a portable scoreboard, and the smart phone is displaying a scorekeeper interface, wherein a user enters in scoring and game information to be displayed on the portable scoreboard.

The scoreboard 10 may include a dedicated remote control 12, but preferably comprises a smartphone or similar handheld electronic device with a wireless connection to the scoreboard 10, through a software app, as shown in FIGS. 3-7. The app preferably includes at least two levels of interactive control. A scorekeeper interface, which is password protected (or otherwise includes restricted access), allows one user to be the scorekeeper, who enters information into various fields displayed on the scorekeeper interface 16 for display on the scoreboard 10 as the game progresses, as shown in FIG. 3. The scorekeeper interface 16 may be divided into various sports, with a screen for each sport, and each individual sport screen includes input fields appropriate for that particular sport. For example, the scorekeeper interface 16 for a baseball or softball game may include input fields for the current score, the current inning, the pitch count, and the location of baserunners currently positioned on the base paths. It may also include the lineup of players on each team, and may display the names of each player as they come up to bat. In another example, for a football game, the scorekeeper interface may include input fields for the score, the quarter, down and distance, time left in the quarter, number of timeouts left, or any other relevant information. Although the scorekeeper interface may be used for any desired sport, for purposes of simplicity (and as an example only), the scorekeeper interface is described herein primarily as it relates to baseball or softball. It is contemplated that any appropriate information may be included for each sport screen, and access to the scorekeeper interface is restricted in any suitable manner, such as a password or facial recognition feature, so that only the scorekeeper may access scorekeeper interface.

Figure 4A:
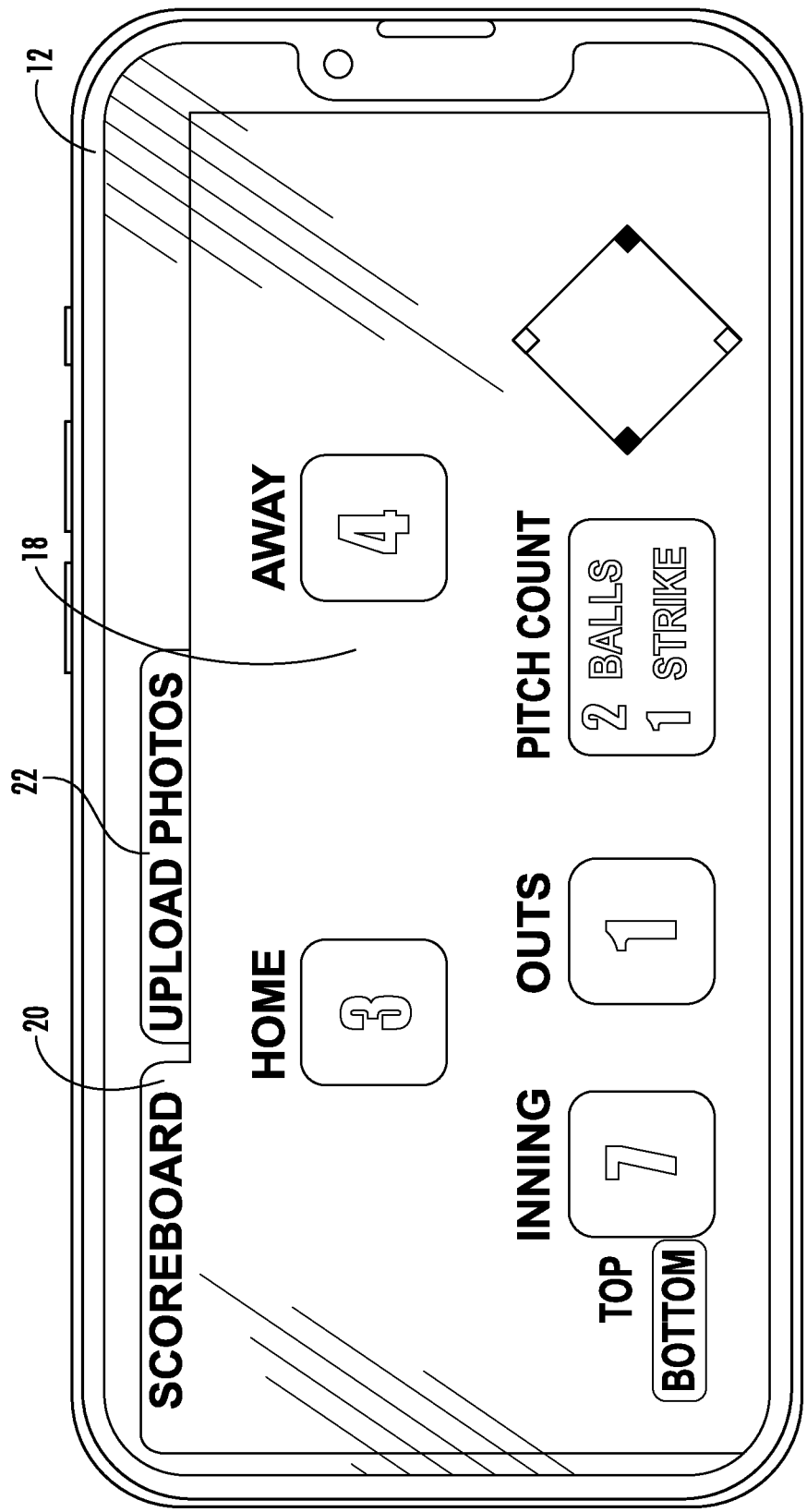
FIG. 4A is a front view of another embodiment of a portable scoreboard system, showing a smart phone that is in wireless communication with a portable scoreboard, and the smart phone is displaying a fan interface showing the same scoring information that is being currently displayed on the portable scoreboard.

A second interface, the fan interface 18, is preferably used for fans, parents, and other non-scorekeepers who wish to keep up with the current score of the game. Fans can download the app onto their smartphones or other remote control devices 12, and under the the scoreboard tab 20 within their app, they can see the same game information that is shown on the portable scoreboard 10 on their own handheld remote control device 12, as shown in FIG. 4A. Additionally, the fan interface 18 further includes a photo/video upload tab 22 allows fans to take photos or videos of the game, the players, or other fans during the game, and to upload those photos and/or videos 24 for display on the portable scoreboard 10 during timeouts, between innings, or during other stoppages of play on the field or court, as shown in FIG. 4B.

In one preferred embodiment, the pictures and videos 24 are uploaded to a cloud service (or, alternatively, pictures and videos may be transmitted directly to a designated audio/video manager, as discussed below), and are received by the scorekeeper, who can then select specific photos or videos 24 to be shown on the scoreboard. This gatekeeping function allows the scorekeeper to prevent any photos or videos 24 that he or she believes are inappropriate from being displayed on the scoreboard 10. In this way, the scorekeeper may select which photos and/or videos will be displayed on the scoreboard 10, in what order, and when. It is contemplated that video highlights of exciting moments during the game may be replayed on the scoreboard 10, and those video highlights and pictures 24 are provided by parents, fans, and other app users who are present at the game, so that the video highlights are collected from a wide variety of sources, and are selectively displayed after review by the scorekeeper.

Figure 5:
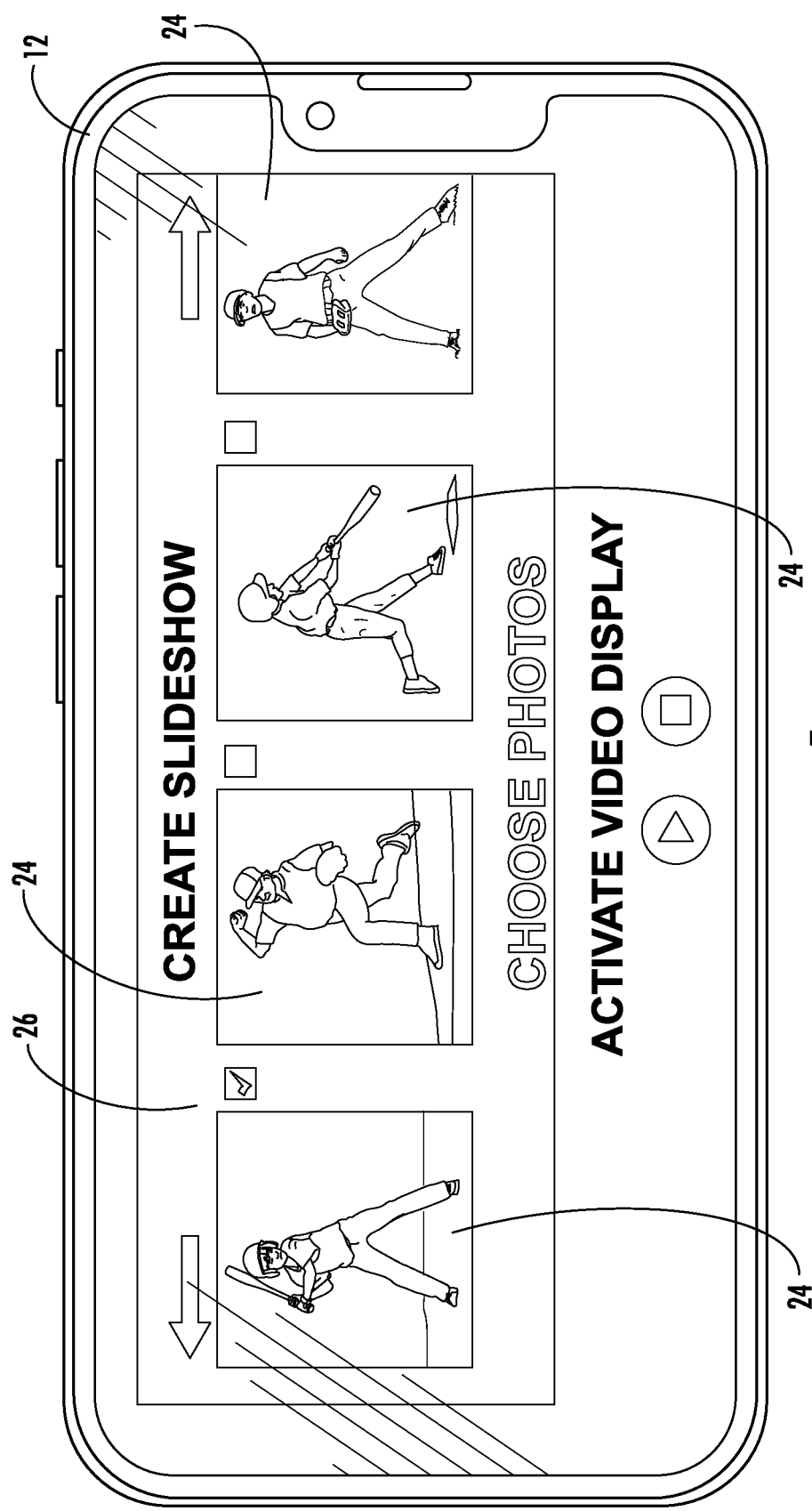
FIG. 5 is a front view of another embodiment of a portable scoreboard system, showing a smart phone that is in wireless communication with a portable scoreboard, and the smart phone is displaying an audio/video interface that allows a designated user to select pictures and video received from the fan interface for display on the video scoreboard.

It is also contemplated that the video and photo review functions may be performed by another designated user, such as an audio/video manager, rather than the scorekeeper, and that party may be designated by the scorekeeper and provided restricted access to a third interface called 'audio-video interface 26,' as shown in FIG. 5. Because the scorekeeper may be busy simply keeping up with and inputting the scoring and other information that has to be constantly updated through the scorekeeper interface 16 throughout the game, another designated party (an audio/video manager) may be provided restricted access to the audio/video interface 26, which receives pictures and video 24 from other fans using the interactive app. The designated audio/video manager may then select appropriate photos and videos 24 from the game that have been uploaded or submitted by other fans, and may submit or upload those selected photos and videos 24 to the scoreboard 10 for display during timeouts, between innings, and at other appropriate times. Optionally, the audio/video interface 26 may include video editing software, allowing the audio video manager to select photos and videos to produce slide shows or other edited video productions, add text, music and sound effects to the video productions to be displayed on the portable electronic video screen or monitor.

Figure 6:
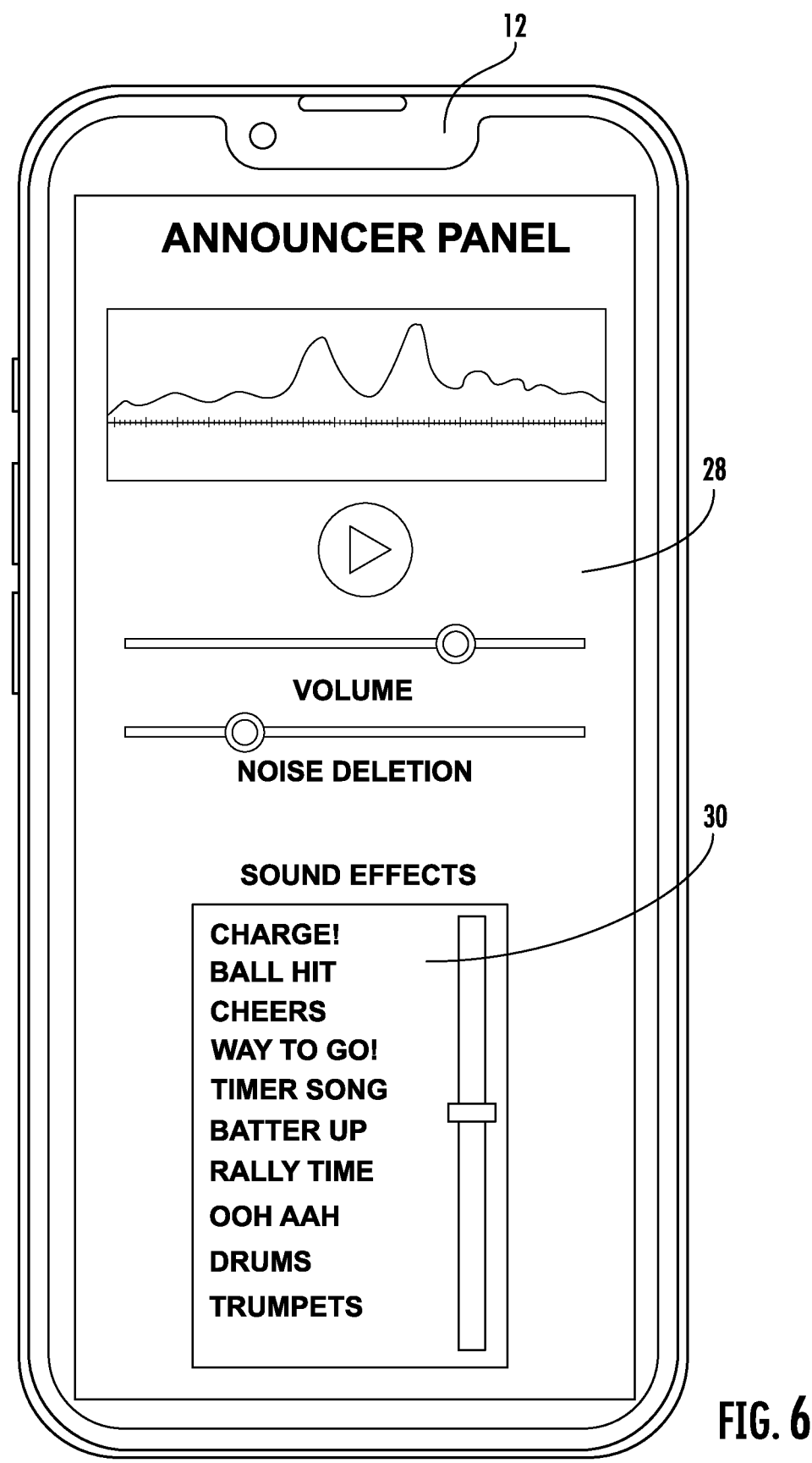
FIG. 6 is a front view of another embodiment of a portable scoreboard system, showing a smart phone that is in wireless communication with a portable scoreboard, and the smart phone is displaying an announcer interface that allows a designated user to make announcements or select various sound effects to be broadcast through speakers attached to the portable scoreboard.

The portable scoreboard 10 may be operationally connected to a smartphone or other remote control device 12 through any suitable means, including Wi-Fi, Bluetooth, or the like. It is also contemplated that the portable scoreboard 10 may include speakers to play audio during video highlights, or may allow the scorekeeper (or another designated user) to serve as an announcer, for instance, announcing the name of the next batter up to bat, or the name of a new pitcher called in from the bullpen. Alternatively, the announcing duties may be passed on to a designated announcer, who may obtain access to yet another interface, the 'announcer interface 28,' as shown in FIG. 6. The announcer interface 28 allows a designated announcer to activate the microphone on his smartphone or other remote control device 12, and to transmit his or her voice through the speakers that are part of, or operatively connected to, the portable scoreboard 10. Further, the announcer interface 28 may include a menu or list of pre-recorded audio sounds 30 that may be broadcast at any time via the announcer interface 28, such as crowd cheers, music, drums, trumpets, or any desired sound effects. Additionally, the fan interface 18 may be programmed to broadcast the announcer's audio announcements through their own smartphone or remote control devices 12, or they may elect to mute or otherwise silence that function, in their personal discretion.

In use, a primary user, such as a parent or fan, may bring the portable scoreboard to a game, set it up, and allow other fans to download the app onto their own smartphone, tablet or other handheld computing device (collectively referred to herein as a "remote control device"). The primary user may either serve all functions as scorekeeper, announcer, audio/video manager and fan for taking and displaying photographs and video, or the primary user may designate one or more other users for any or all of those roles. Anyone not designated in one of those roles only has access to the fan interface, allowing them to view the same game information on their smartphone or other remote control device as that which is displayed on the scoreboard 10, preferably to select and upload video and photographs 24 for display on the scoreboard, and in some cases, to hear the audio feed from the announcer interface 28. The other interfaces, in a preferred embodiment, may be restricted so that they may only be operated by a single designated user, such as the announcer interface 28, the scorekeeper interface 16, and the audio/video interface 26, as those interfaces require some type of verification for access, such as a password, facial recognition, or any limited access protocol to restrict access to those interfaces. For restricted access interfaces, it should be understood that one user may serve multiple roles, but the concept is that multiple users should not be able to alter the scores on the scoreboard, or be able to transmit audio through the announcer interface 28, for example. When the game is over, the primary user (owner of the system, for instance) simply packs up the scoreboard for storage or transport.

Figure 7:
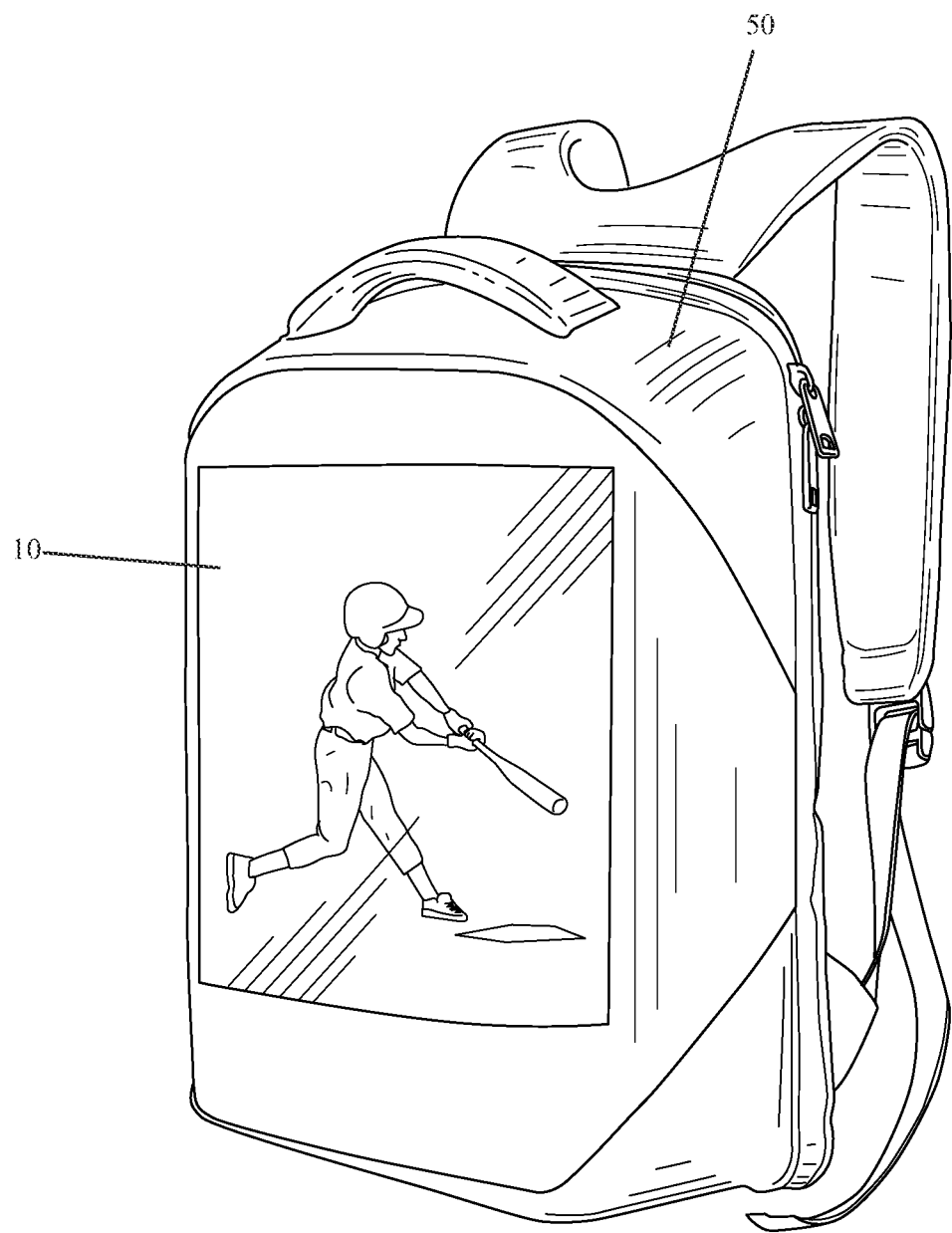
FIG. 7 is a perspective view of another embodiment of a portable scoreboard system, wherein a portable scoreboard is attached to a backpack.

In yet another embodiment, the portable scoreboard 10 is attached to a backpack 50, as shown in FIG. 7. In this embodiment, the portable scoreboard may be removable from the backpack, or it may be integrated into the backpack. In this embodiment, the backpack may simply be hung from a hook, or attached to a fence or other structure, as desired in any number of ways, as will be appreciated by those skilled in the art.

Additionally, it should be understood that the portable screen may be wirelessly (or via a wired connection such as an HDMI cord) transmitted to and displayed by any type of smart video monitor from any smart device that runs the app, similarly to the screen mirroring function utilized by most devices from Apple, Inc. In other words, a user may view the app on their smartphone or tablet, and may also choose to wirelessly transmit the same information shown on their smartphone to smart television, and Apple TV, or the like, so that the wireless transmission feature works similarly to the screen mirroring feature that is commonly found on iPhones, iPads, Mac computers, and the like from Apple, Inc., as well as Android devices or similar operating systems, both future and present.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:
1. A portable scoreboard system comprising:
a portable electronic scoreboard;
at least one remote control device in wireless communication with said portable electronic scoreboard, wherein said remote control device
comprising a processor to perform operations of:
displaying multiple user interfaces by downloading an app for remotely controlling the portable electronic scoreboard,
wherein the app includes multiple scoreboard interfaces so that each scoreboard interface includes specific, appropriate input fields for keeping score and providing relevant game information for a specific, selected sport,
wherein a first interface of said multiple scoreboard interface is a scoreboard interface that allows a designated scorekeeper to enter scores and other current game information;
wherein a second interface of said multiple user interfaces are selected from the group consisting of a fan interface, an audio/video interface, and an announcer interface,
wherein the fan interface allows a user to select and display photographs and video, the audio/video interface allows a designated user to display fan uploaded pictures and video highlights, and the announcer interface for a designated announcer to make announcements through speakers, so that only one user desig- nated to each of the scoreboard interface, the audio/video interface and the announcer interface are accessible, and wherein the announcer interface also includes a list of pre-recorded audio sounds that may be selected by the announcer to be broadcast wirelessly through said at least one audio speaker.

2. The portable scoreboard system set forth in claim 1, wherein said at least one remote control device is selected from the group consisting of a smart phone, a tablet, a laptop computer and a handheld computing device.

3. The portable scoreboard system set forth in claim 1, wherein said fan interface allows multiple users to view said score and game information on any of said multiple remote control devices, and said fan interface further allows multiple users to select and submit photographs and video to be displayed on said portable electronic screen.

4. The portable scoreboard system set forth in claim 3, wherein said audio video interface allows said designated user to receive said photographs and video from other users, and further to select some or all of said photographs and videos submitted by other users to be displayed on said portable electronic scoreboard.

5. The portable scoreboard system set forth in claim 1, wherein said portable electronic scoreboard is operatively connected to at least one audio speaker, and said announcer interface allows a user to speak into said remote control device and transmit announcements to be broadcast wirelessly through said at least one audio speaker.

6. The portable scoreboard system set forth in claim 1, wherein said fan interface is programmed to receive and play audio from said announcer interface from any of said multiple remote control devices.

7. The portable scoreboard system set forth in claim 1, wherein said portable electronic scoreboard is attached to a backpack.

8. The portable scoreboard system set forth in claim 7, wherein said portable electronic scoreboard is removably attached to said backpack.

* * * * *